United States Patent
Ye

(10) Patent No.: US 11,849,282 B2
(45) Date of Patent: Dec. 19, 2023

(54) ONLINE TRIMMED MEMS MICROPHONE AND ELECTRONIC DEVICE

(71) Applicants: ZILLTEK TECHNOLOGY (SHANGHAI) CORP., Shanghai (CN); ZILLTEK TECHNOLOGY CORP., Hsinchu (TW)

(72) Inventor: Jinghua Ye, Shanghai (CN)

(73) Assignee: ZILLTEK TECHNOLOGY CORP., Hsinchu (TW)

( * ) Notice: Subject to any disclaimer, the term of this patent is extended or adjusted under 35 U.S.C. 154(b) by 112 days.

(21) Appl. No.: 17/665,062

(22) Filed: Feb. 4, 2022

(65) Prior Publication Data

US 2023/0044905 A1 Feb. 9, 2023

(30) Foreign Application Priority Data

Aug. 5, 2021 (CN) .......................... 202110897380.3

(51) Int. Cl.
| | |
|---|---|
| *H04R 19/04* | (2006.01) |
| *G10L 19/00* | (2013.01) |
| *H04R 3/00* | (2006.01) |
| *H04R 25/00* | (2006.01) |

(52) U.S. Cl.
CPC .............. *H04R 19/04* (2013.01); *G10L 19/00* (2013.01); *H04R 3/00* (2013.01); *H04R 25/604* (2013.01); *H04R 2201/003* (2013.01); *H04R 2430/01* (2013.01)

(58) Field of Classification Search
CPC ........ H04R 19/04; H04R 3/00; H04R 25/604; H04R 2201/003; H04R 2430/01; G10L 19/00
See application file for complete search history.

(56) References Cited

U.S. PATENT DOCUMENTS

| | | | |
|---|---|---|---|
| 2008/0075306 A1* | 3/2008 | Poulsen ............... | H04R 19/005 381/59 |
| 2015/0318829 A1* | 11/2015 | Astgimath ............. | H03F 3/505 330/291 |
| 2016/0098921 A1* | 4/2016 | Qutub ................... | G08C 23/02 367/197 |
| 2016/0360304 A1* | 12/2016 | Northemann ........ | H04R 19/016 |
| 2017/0155378 A1* | 6/2017 | Hu .......................... | G06F 1/324 |
| 2017/0289670 A1* | 10/2017 | Gilbertson ........... | H04R 1/1016 |
| 2021/0152935 A1* | 5/2021 | Seldess ................. | H04R 5/033 |

* cited by examiner

*Primary Examiner* — Norman Yu
(74) *Attorney, Agent, or Firm* — Clement Cheng

(57) ABSTRACT

The invention relates to the technical field of microphones, in particular to an online trimmed MEMS microphone. The online trimmed MEMS microphone comprises an acoustic transducer for receiving an external ultrasonic signal and converting the ultrasonic signal into an electric signal; an ASIC (Application Specific Integrated Circuit) chip, coupled to the acoustic transducer, wherein the ASIC chip comprises: an amplifier unit for performing amplification on the electric signal and outputting an amplified signal; a decoding unit, connected to the amplifier unit, and configured to decode the amplified signal to obtain a decoded signal sequence; a matching unit, connected to the decoding unit, and configured to match the decoded signal sequence with a predetermined identification code to obtain a matched signal; a control unit, connected to the matching unit, and configured to generate one or more circuit adjusting parameters under the action of the matched signal.

8 Claims, 1 Drawing Sheet

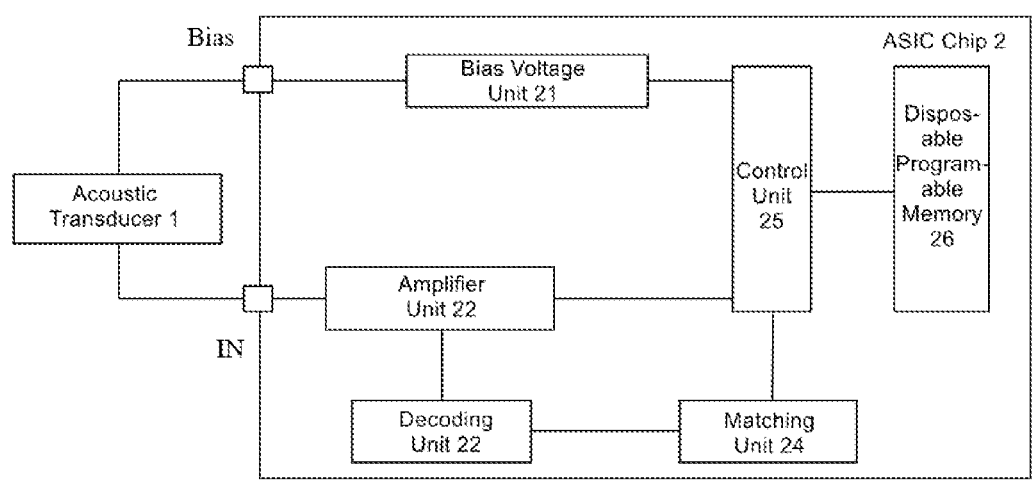

ONLINE TRIMMED MEMS MICROPHONE AND ELECTRONIC DEVICE

BACKGROUND OF THE INVENTION

1. Field of the Invention

The invention relates to the technical field of microphones, and more particularly, to an online trimmed MEMS microphone.

2. Description of the Related Art

After a MEMS microphone is packaged, circuit parameters of the MEMS microphone system need to be adjusted depending on specific applications. The prior art discloses a single-wire programmable MEMS microphone and a method for programming the same, and a system. A main circuit module and OTP/circuit modules are controlled to be working in a programmable state or in a normal working state based on the voltage of an OUT interface. Gain configuration of an OTP memory inside an ASIC chip is achieved by multiplexing the OUT interface, then calibration of gain of a finished MEMS microphone subjected to package is made.

However, a problem found in the prior art is that only when the ASIC chip is connected to a host computer can a calibration process be started. However, in some situations where calibration and operation should be implemented simultaneously, such as calibration of circuit parameters of the MEMS microphone in a hearing aid, online trimming cannot be done.

SUMMARY OF THE INVENTION

Given that the foregoing problems exist in the prior art, the present invention provides an online trimmed MEMS microphone.

An online trimmed MEMS microphone, comprising:

an acoustic transducer for receiving an external ultrasonic signal and converting the ultrasonic signal into an electric signal;

an ASIC (Application Specific Integrated Circuit) chip, coupled to the acoustic transducer, wherein the ASIC chip comprises:

an amplifier unit for performing amplification on the electric signal and outputting an amplified signal;

a decoding unit, connected to the amplifier unit, and configured to decode the amplified signal to obtain a decoded signal sequence;

a matching unit, connected to the decoding unit, and configured to match the decoded signal sequence with a predetermined identification code to obtain a matched signal;

a control unit, connected to the matching unit, and configured to generate one or more circuit adjusting parameters under the action of the matched signal.

The online trimmed MEMS microphone according to the present invention further comprises a bias voltage unit, connected to the control unit, and configured to regulate the magnitude of a bias voltage based on the control of the control unit.

In the online trimmed MEMS microphone according to the present invention, the amplifier unit is connected to the control unit, and it regulates a current of the amplifier unit and/or a gain of the amplifier unit based on the control of the control unit.

In the online trimmed MEMS microphone according to the present invention, the bias voltage unit comprises a first adjustable switch network, the first adjustable switch network is controllably turned on or off under the action of a first circuit adjusting parameter, to regulate the magnitude of the bias voltage.

In the online trimmed MEMS microphone according to the present invention, the amplifier unit comprises a second adjustable switch network, the second adjustable switch network is controllably turned on or off under the action of a second circuit adjusting parameter, to regulate the current of the amplifier unit;

further comprising a third adjustable switch network, wherein the third adjustable switch network is controllably turned on or off under the action of a third circuit adjusting parameter, to regulate the gain of the amplifier unit.

In the online trimmed MEMS microphone according to the present invention, the ultrasonic signal is a frequency-variable ultrasonic signal, a frequency of the ultrasonic signal is greater than 20 KHz.

In the online trimmed MEMS microphone according to the present invention, the predetermined identification code comprises an address code.

The online trimmed MEMS microphone according to the present invention further comprises a disposable programmable memory, connected to the control unit, and configured for storing the predetermined identification code.

The invention further provides an electronic device comprising the online trimmed MEMS microphone as described above.

The electronic device is a hearing aid.

By adopting the above-mentioned technical solutions, the present invention has beneficial effects that the MEMS microphone receives the ultrasonic signal, then the decoded signal sequence is obtained, and the decoded signal sequence is matched with the predetermined identification code. If a successful match is made, online trimming of the one or more circuit adjusting parameters is achieved.

BRIEF DESCRIPTION OF THE DRAWINGS

FIG. 1 is a schematic diagram illustrating a structure of an online trimmed MEMS microphone according to the present invention.

DETAILED DESCRIPTION

The technical solution set forth in the embodiments of the present invention will now be described clearly and fully hereinafter with reference to the accompanying drawings of the embodiments of the present invention. Obviously, such embodiments provided in the present invention are only part of the embodiments instead of all embodiments. It should be understood that all the other embodiments obtained from the embodiments set forth in the present invention by one skilled in the art without any creative work fall within the scope of the present invention.

Notably, the embodiments set forth in the present invention and features of the embodiments may be combined in any suitable manner The present invention will be further described hereinafter with reference to the accompanying drawings and particular embodiments, but the invention is not limited thereto.

With reference to FIG. 1, an online trimmed MEMS microphone, comprising:

an acoustic transducer 1 for receiving an external ultrasonic signal and converting the ultrasonic signal into an electric signal;

an ASIC (Application Specific Integrated Circuit) chip 2, coupled to the acoustic transducer 1, wherein the ASIC chip 2 comprises:

an amplifier unit 22 for performing amplification on the electric signal and outputting an amplified signal;

a decoding unit 23, connected to the amplifier unit 22, and configured to decode the amplified signal to obtain a decoded signal sequence;

a matching unit 24, connected to the decoding unit 23, and configured to match the decoded signal sequence with a predetermined identification code to obtain a matched signal;

a control unit 25, connected to the matching unit 24, and configured to generate one or more of circuit adjusting parameters under the action of the matched signal.

The MEMS microphone provided in the present invention receives the ultrasonic signal, then the decoded signal sequence is obtained, and the decoded signal sequence is matched with the predetermined identification code. If a successful match is made, online trimming of the one or more circuit adjusting parameters is achieved. When compared with the traditional method in which hardware needs to be removed and externally applied excitation is needed for trimming, such a method provided in the present invention facilitates the trimming of the system.

The online trimmed MEMS microphone according to the present invention further comprises a bias voltage unit 21, connected to the control unit 25, and configured to regulate the magnitude of a bias voltage Bais based on the control of the control unit 25.

In the online trimmed MEMS microphone according to the present invention, an input end IN of the amplifier unit 22 is connected to an output end of the acoustic transducer 1, a control end of the amplifier unit 22 is connected to the control unit 25, and it regulates a current of the amplifier unit 22 and/or a gain of the amplifier unit 22 based on the control of the control unit 25.

In the online trimmed MEMS microphone according to the present invention, the bias voltage unit 21 comprises a first adjustable switch network, the first adjustable switch network is controllably turned on or off under the action of a first circuit adjusting parameter, to regulate the magnitude of the bias voltage Bias.

In the online trimmed MEMS microphone according to the present invention, the amplifier unit 22 comprises a second adjustable switch network, the second adjustable switch network is controllably turned on or off under the action of a second circuit adjusting parameter, to regulate the current of the amplifier unit 22;

further comprising a third adjustable switch network, wherein the third adjustable switch network is controllably turned on or off under the action of a third circuit adjusting parameter, to regulate the gain of the amplifier unit 22.

The adjustable switch network may comprise a resistor matrix with a first number of resistor rows and a first number of resistor rows in a shape of grid, and a plurality of corresponding switches. The adjustable switch network adjusts the circuit parameters by controlling on and off of the plurality of switches.

In the online trimmed MEMS microphone according to the present invention, the ultrasonic signal is a frequency-variable ultrasonic signal, a frequency of the ultrasonic signal is greater than 20 KHz. The ultrasonic signals of 24 KHz and 28 KHz can be transmitted alternately and successively. When the ultrasonic signal is consistent with the predetermined identification code such as 0101, an online trimming mode is turned on. When the system comprises a plurality of microphones, the predetermined identification code comprises an address code to trim different microphones.

The online trimmed MEMS microphone of the present invention includes a disposable programmable memory 26, connected to the control unit 25, and configured for storing a predetermined identification code.

The present invention also provides an electronic device, including the above-mentioned online trimmed MEMS microphone.

The electronic device of the present invention is a hearing aid. The hearing aid is trimmed while being worn, so that timeliness and accuracy of the trimming process can be ensured.

Exemplary embodiments of specific structures for implementations are illustrated with reference to the description and the accompanying drawings. Other conversions can be made based on the spirits of the invention. The above descriptions are only the preferred embodiments of the invention, not thus limiting the embodiments and scope of the invention.

For those skilled in the art, all variations and modifications are obvious from the above description. Thus, the appended claims are to be construed as all the variations and modifications covering all the true intentions and scope of the invention. Any and all the equivalent scope and contents fall within the spirit and scope of the invention.

What is claimed is:

1. An online trimmed MEMS microphone, comprising: an acoustic transducer for receiving an external ultrasonic signal and converting the ultrasonic signal into an electric signal; an ASIC (Application Specific Integrated Circuit) chip, coupled to the acoustic transducer, wherein the ASIC chip comprises: an amplifier unit for performing amplification on the electric signal and outputting an amplified signal; a decoding unit, connected to the amplifier unit, and configured to decode the amplified signal to obtain a decoded signal sequence; a matching unit, connected to the decoding unit, and configured to match the decoded signal sequence with a predetermined identification code to obtain a matched signal;

a control unit, connected to the matching unit, and configured to generate one or more circuit adjusting parameters under the action of the matched signal; a bias voltage unit comprises a first adjustable switch network, the first adjustable switch network is controllably turned on or off under the action of a first circuit adjusting parameter, to regulate the magnitude of the bias voltage; wherein the amplifier unit comprises a second adjustable switch network, the second adjustable switch network is controllably turned on or off under the action of a second circuit adjusting parameter, to regulate the current of the amplifier unit; further comprising a third adjustable switch network, wherein the third adjustable switch network is controllably turned on or off under the action of a third circuit adjusting param eter, to regulate the gain of the amplifier unit.

2. The online trimmed MEMS microphone of claim 1, further comprising: a the bias voltage unit, connected to the control unit, and configured to regulate the magnitude of a bias voltage based on the control of the control unit.

3. The online trimmed MEMS microphone of claim 1, wherein the amplifier unit is connected to the control unit, and it regulates a current of the amplifier unit and/or a gain of the amplifier unit based on the control of the control unit.

4. The online trimmed MEMS microphone of claim 1, wherein the ultrasonic signal is a frequency-variable ultrasonic signal, a frequency of the ultrasonic signal is greater than 20 KHz.

5. The online trimmed MEMS microphone of claim 1, wherein the predetermined identification code comprises an address code.

6. The online trimmed MEMS microphone of claim 1, further comprising a disposable programmable memory, connected to the control unit, and configured for storing the predetermined identification code.

7. An electronic device comprising the online trimmed MEMS microphone of claim 1.

8. The electronic device of claim 7, wherein the electronic device is a hearing aid.

\* \* \* \* \*